United States Patent [19]

Umiastowski et al.

[11] Patent Number: 4,769,541
[45] Date of Patent: Sep. 6, 1988

[54] SPECTROMETRIC GAMMA DIAGRAPHY SYSTEM FOR THE DETERMINATION OF THE GEOLOGICAL PARAMETERS OF A ROCK

[75] Inventors: Krzysztof Umiastowski, Saint Cloud; Bertrand Chenin, Chateau Thierry, both of France

[73] Assignee: Commissariat a l'Energie Atomique, Paris, France

[21] Appl. No.: 844,571

[22] Filed: Mar. 27, 1986

[30] Foreign Application Priority Data

Apr. 2, 1985 [FR] France .................................. 85 04979

[51] Int. Cl.⁴ .............................................. G01V 5/00
[52] U.S. Cl. .................................... 250/256; 250/253
[58] Field of Search ..................... 250/253.1, 256, 269, 250/270

[56] References Cited

U.S. PATENT DOCUMENTS 4,475,038  10/1984  Lochmann et al. ................. 250/270
4,492,863  1/1985  Smith, Jr. ............................ 250/256

FOREIGN PATENT DOCUMENTS 2224766  10/1974  France .
1282937  7/1972  United Kingdom .

OTHER PUBLICATIONS

International Journal of Applied Radiation and Isotopes, vol. 34, No. 1, Jan. 1983, pp. 153-172, Pergamon Press Ltd., Oxford, GB; J. A. Czubek: "Advances in Gamma-Gamma Logging".

Primary Examiner—Janice A. Howell

[57] ABSTRACT

This system comprises means for standardizing the detected gamma spectrum and processing it by a reference spectrum. The lithology and/or the nature of the ores are determined, by a processing means, by comparison between the standard recorded spectrum and lithology and/or ore spectrum models contained in a library. The ore content, density and porosity can also be determined without supplementary measurements on the basis of the lithology and the nature of the ores.

11 Claims, 5 Drawing Sheets

SPECTROMETRIC GAMMA DIAGRAPHY SYSTEM FOR THE DETERMINATION OF THE GEOLOGICAL PARAMETERS OF A ROCK

BACKGROUND OF THE INVENTION

The present invention relates to gamma spectrometric diagraphy system for the determination of the geological parameters of a rock. This sytem more particularly makes it possible to determine the lithology of a rock, i.e. its nature, the nature of the ores and more specifically the heavy elements contained therein, the content of the ores and the density of the rock. The system according to the invention can be used in prospecting for raw materials, such as uranium and certain other metals (lead, iron, etc) or oil.

The measurement of the gamma radiation has long been used in geophysics for determining the characteristics of a rock. The gamma radiation diffused or scattered by a rock is detected by a probe, which converts this radiation into electrical pulses. The analysis of the energy spectrum of these pulses makes it possible to determine certain geological characteristics of the rock.

At present several measuring principles are used and reference is made to some of these hereinafter.

Natural gamma diagraphy involves the probe detecting the gamma radiation emitted by the rock. This method is mainly used for the determination of the lithology and for detecting the natural radioactivity of the rock, particularly for uranium prospecting. In this method, the uranium content is determined either by total gamma counting, or by counting in two energy windows.

In the "universal" gamma-gamma diagraphy method, the intensity of the gamma radiation scattered in the rock and coming from a gamma radiation source contained in the probe is measured. This method is used for determining the density of the rock. Selective gamma-gamma diagraphy is based on the measurement in certain energy windows of the intensity of the gamma radiation scattered by the rock and coming from a gamma radiation source contained in the probe. These methods are based on the counting of gamma photons in one or more energy windows of relatively great width or on the determination of the position of the maximum of the spectrum. They are used for solving certain specific problems, such as determining the content of iron, zinc or lead ores.

In neutron-gamma diagraphy, the secondary gamma radiation emitted by the rock under the effect of a bombardment with neutron from a neutron source contained in the probe is measured. This method makes it possible to detect hydrogen and consequently water and hydrocarbon and in this way indicates the porosity of the rock.

The different aforementioned methods suffer from a number of disadvantages. A first limitation is that each method only makes it possible to determine a single geological parameter and it is consequently necessary to perform a number of measurements with different probes to determine all the geological parameters characterising the analysed rock.

Another disadvantage is that the measurement results relating to one geological parameter can be disturbed by variations in all the geological parameters which are not always known. For example, when determining the uranium content by a total count of the gamma radiation intensity, The result is dependent on the radioactive disequilibrium which can vary from one point to another of a deposit and even along a bore. In the same way, the results of density measurements by the gamma-gamma method are dependent on the lithology, so that the probe has to be calibrated for each particular lithology. Finally, in per se known manner, the determination of the nature of ores (heavy elements) contained in the rock takes place by selective gamma-gamma diagraphy or by neutron-gamma diagraphy, by extracting characteristic peaks of the energy spectrum in the latter case. This extract is difficult, because an intense continuous spectrum due to diffusions or scatterings in the rock and in the bore are superimposed on these peaks and mask them. According to the prior art, this continuous spectrum is not used for determining geological parameters and is instead eliminated so as to only retain the characteristic peaks of the different minerals. The other geological parameters are independently determined by complementary measurements.

A first objective of the invention is to make it possible to determine a maximum number of geological parameters from a single spectrum measurement. It is known that the geological informations are contained not only in the characteristic peaks of a spectrum, but also in the continuous spectrum, of the article entitled "A universal gamma-gamma method for simultaneous determination of rock and ore properties" by J. CHARBUCINSKI, published in Nuclear geophysics, Pergamon Press, 1983, pp 353–361.

The determination of geological parameters by means of a single gamma radiation spectrum has the first advantage of limiting the number of passages of the probes through the drill hole or bore and consequently the duration of the measurements, whilst only a single universal probe is used.

Moreover, simultaneously obtaining information on the different geological parameters makes it possible to improve the precision of the measurements. For example, having knowledge of the lithology makes it possible to choose the appropriate calibration curve for determining the density. The system according to the invention can be used for processing the results of spectrometric gamma-gamma measurements, spectrometric measurements of the natural gamma radiation and for processing the continuous component of the spectrum recorded during neutron-gamma measurements.

In the latter case the nature and content of the ores can be determined in per se known manner by detection of the characteristic peaks. The originality of the invention here is that it takes into account the continuous spectrum in order to determine, without any supplementary measurement, the lithography and density of the mother rock or matrix, whereas in the prior art continuous spectrum is not analysed and is instead eliminated to permit the analysis of the peaks.

The system according to the invention is based on the exploitation of the photoabsorption phenomenon in the rock. The shape of the spectrum of the gamma radiation scattered in the rock is mainly determined by two physical processes, namely Compton scattering and photoabsorption. Compton scattering is an interaction between a gamma photon and a free electron, or an electron whose bonding energy to the atom is negligible compared with the energy transmitted by the photon. In this interaction, the gamma photon loses part of its energy and undergoes a direction change. The means energy loss decreases with the initial energy decrease of the photon. For this reason, there is an accumulation of low energy photons in the spectrum of the scattered photons. This accumulation is limited by the photoabsorption of the photons, whose energy is comparable to the bonding energy of the electrons in the atom. The effective cross-section for the photoabsorption increases very rapidly when the energy of the photon decreases and is proportional to $E^{-3.5}$, in which E is the energy of the photon. The shape of the spectrum and the position of its maximum are dependent on the chemical composition of the rock, or more directly on the ratio of the photoabsorption coefficient to the total Compton mass attenuation coefficient of said rock.

The principle of the invention is to determine the geological parameters by solely exploiting the photoabsorption phenomenon in the analysed rock. To this end, the system according to the invention has means making it possible to extract from the measured spectrum the parameters depending solely on the photoabsorption. This extraction is carried out by correcting the recorded spectrum with the aid of a reference spectrum, which mainly takes account of the Compton scattering.

According to the invention, this standardized spectrum is then compared with models of spectra contained in a library, said comparison consisting of seeking the spectrum model which is closest or the combination of spectrum model closest to the standardized recorded spectrum. On the basis of a single recorded spectrum, this method makes it possible to determine the lithology and/or the nature of the ores contained in the analysed rock.

For determining the lithology for example, the recorded standard spectrum is compared with lithology standard spectrum models. For determining the nature of the ores contained in the rock, the recorded standard spectrum is compared with standard spectrum models of ores.

SUMMARY OF THE INVENTION

More specifically, the present invention relates to a spectrometric gamma diagraphy system for determining the geological parameters of a rock comprising a probe, which is introduced into a bore hole made in the ground and which supplies an electric pulse signal corresponding to the gamma emission of said rock, a transmission means for carrying said pulse signal out of the bore, a means for producing an energy spectrum of said pulse signal and a processing means wherein the processing means comprises a means for standardizing the energy spectrum received by means of a reference energy spectrum included at least the Compton scattering phenomenon, a library of energy spectrum models of materials, said spectra being standardized by means of the reference energy spectrum, a processor and storage means, whereby said processor is able to store the standard measured energy spectrum and compare said spectrum with at least one energy spectrum model of the materials.

The term spectrum must be understood here in a relatively general sense. It is understood to mean an energy distribution of a signal measured according to an arbitrary amplitude scale, which may or may not be linear. This amplitude scale can in particular be logarithmic, exponential or in general terms any rising continuous function.

In a preferred manner, the spectra used are represented in a logarithmic amplitude scale. The standardizaton of the recorded spectrum then consists of subtracting the reference spectrum, whose amplitude scale is logarithmic, from the recorded spectrum. In this case, the comparison with a model consists of determining the linear combination of spectrum models producing the spectrum closest to the standard measured energy spectrum. In general terms, the standardization means carries out an operation between the recorded spectrum and the reference spectrum corresponding to a division of these spectra expressed in linear amplitude scale.

In preferred manner, the library has a group of lithology energy spectrum models, the processor determining the lithology of the ground. According to a feature of the system according to the invention for determining the lithology, the processor is able to successively compare the standard measured spectrum with each lithology spectrum mode, define a "distance" between said measured spectrum and each lithology spectrum model, whereby the lithology of the ground is that having the closest spectrum model, in terms of distance, with respect to the standard recorded spectrum.

According to another preferred feature of the invention, the library also has group of energy spectrum models of ores, the processor being able, following the determination of the lithology, to determine the nature of the ores of the ground by seeking the linear combination of the lithology spectrum and of at least one spectrum of the group of spectrum models of the ores closest to the standard recorded spectrum.

According to another preferred embodiment of the inventive system for the determination of the geological parameters of the ground or soil whose lithology is known, the library has a group of energy spectra of the ores, the processor being able to determine the nature of the ores in the rock by seeking the linear combination of the lithology spectrum and at least one spectrum of the group of ore spectrum models closest to the standard recorded spectrum.

In a preferred manner, for determining the nature of the ores in the rock, the processor is able to compare the standard recorded spectrum with the linear combination between the lithology spectrum and an ore spectrum, measure a distance between said spectrum received and said linear combination, repeat said comparison and said measurement for each ore spectrum and determine the shortest distance, the rock containing the ore corresponding to said shortest distance.

According to a feature of the inventive system, the processor is able to determine the content of the ores as a function of the coefficients of the linear combination of the lithology spectrum and at least one ore spectrum.

According to another feature of the inventive system, in an application to the determination of the uranium content, the processor is able to determine said content by the maximum of the derivative of the standard recorded spectrum by a reference spectrum chosen from the library of lithology spectra.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figures 1, 2:
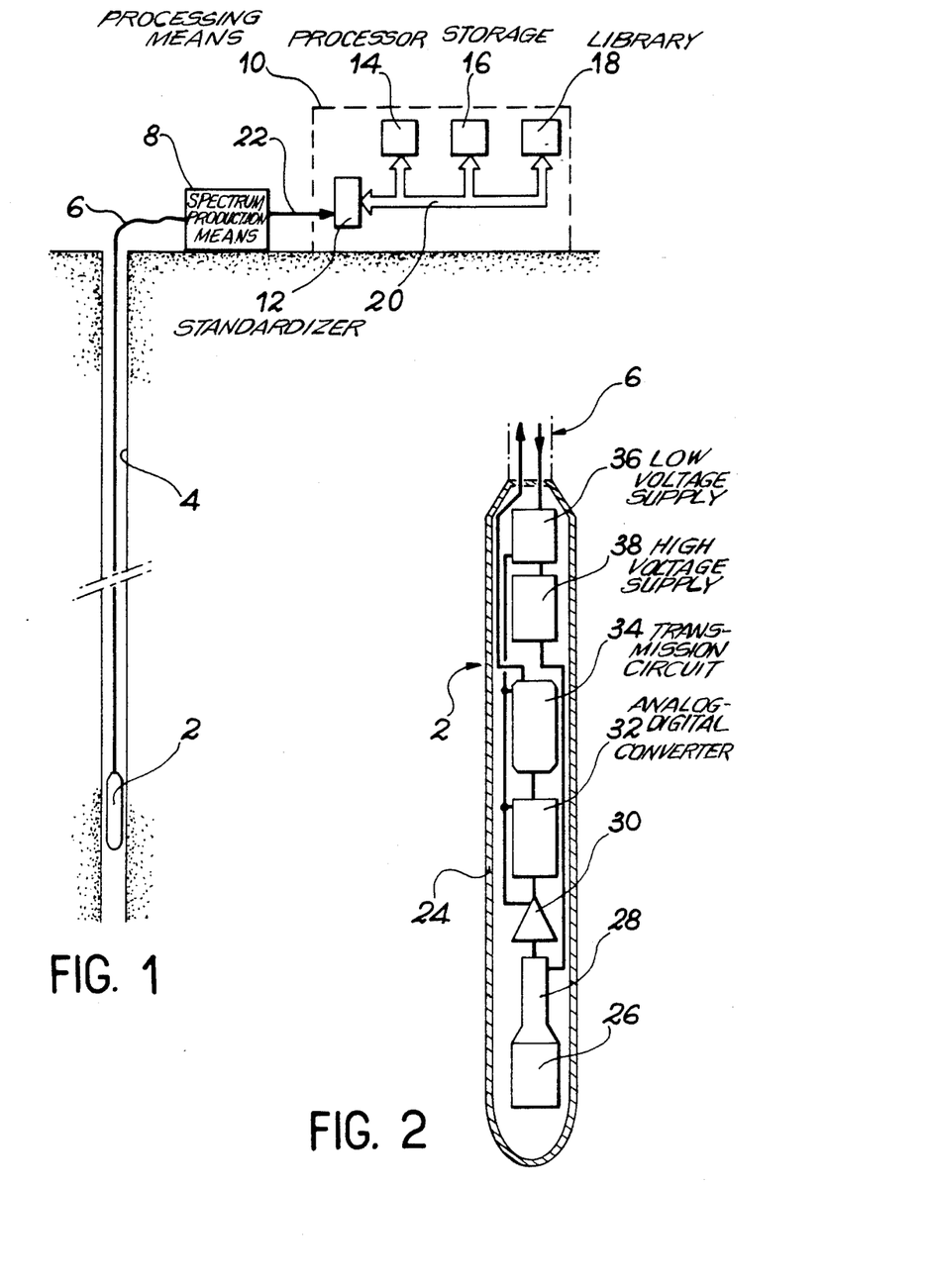
FIG. 1, a diagrammatic representation of the system according to the invention.
FIG. 2, an embodiment of the probe of the system of FIG 1.

FIG. 1 diagrammatically shows the system according to the invention, which comprises a probe 2 placed in a drill hole or bore 4, a transmission means 6 for carrying the pulse signal supplied by the probe out of the bore 4, a means 8 for producing an energy spectrum of said signal and a processing means 10.

The transmission means 6 has at least one channel for transmitting out of the bore the pulse signal supplied by the probe and one channel for electrically supplying the probe from the surface. The pulses supplied by the probe can be transmitted in analogue or digital form. In the first case, the shape of the pulses can be disturbed during transmission, which leads to measuring errors which can be significant in certain cases. It is therefore preferable to transmit the amplitude of the pulses in digital form.

The pulses supplied by the transmission means 6 are received by the energy spectrum production means 8, which can e.g. be a multichannel analyzer. This spectrum is supplied by a channel 22 to the processing means 10.

Processing means 10 comprises means 12 for standardizing the recorded energy spectrum. This standardization consists of treating or processing the recorded spectrum with a reference spectrum in such a way as to only retain in the recorded spectrum that which is dependent on the photoabsorption due to the geology of the ground to be analyzed. The reference spectrum takes into account at least the Compton scattering phenomenon in order to eliminate the contribution of the Compton phenomenon to the recorded spectrum. In practice, it is also of interest for the reference spectrum to take account of the absorption due to the probe. The processing performed by the standardization means consists of dividing the recorded spectrum by the reference spectrum in the case where these spectra are expressed in a linear amplitude scale. However, the amplitude scale of the recorded spectrum is not necessarily linear but can in fact be represented by any rising and in particular logarithmic function. The reference spectrum is represented in the same scale. In the case where the spectra are expressed in a logarithmic amplitude scale, the standardization means subtracts the reference spectrum from the recorded spectrum.

In the case where the lithology of the ground is known and the recorded spectrum is mainly used for determining the nature of the ores contained in the rock, the reference spectrum can include the photoabsorption due to said lithology. The standard recorded spectrum then contains all the inforamtion on the geology of the rock, except the lithology.

Processing means 10 has a processor 10, 14, a storage means 16 and a spectrum model library 18. These components are connected to one another and to the standardization means 12 by a communication bus 20 having control, address and data channels. Library 18 comprises a group of energy spectrum models of materials. These spectra are expressed in an amplitude scale identical to that used for the recorded spectrum and for the reference spectrum. The library spectra are also standardized by means of said reference spectrum.

The library 18 may solely contain lithology spectrum models if the analysis systems is used solely for determining the lithology of the rock. This library may also contain solely or spectrum models, if the spectrum recorded is analysed solely with a view to determining the nature of the ores contained in the mother rock or matrix. Library 18 may finally simultaneously contain lithology spectrum models and ore spectrum models if the processing performed on the recorded spectrum aims at simultaneously determining the lithology and nature of the ores.

Library 18 can in particular be constituted by a read-only memory. Memory 16 is a random-access memory for storing the recorded standard spectrum and for acting as a working memory for the processor 14. The latter has a read-only memory containing instructions, the processor performing the instructions and being able to store the standard recorded spectrum in memory 16 and determine a linear combination of spectrum models contained in library 18 producing the spectrum closest to that of the standard recorded spectrum. The determination of the coefficients of said linear combination defines the geological parameter associated with the library 18.

FIG. 2 diagrammatically illustrates an embodiment of the probe. The components of the latter are placed in a cylindrical box or case 24 with approximate dimensions diameter 35 mm and length 2 m. This box comprises in series a gamma ray detector 26, such as a NaI scintillator, a photomultiplier 28, an amplifier 30, an analogue - digital converter 32 and a transmission circuit 34. It also comprises a low voltage supply 36 for supplying the amplifier, converter and transmission circuit, together with a high voltage supply 38 for supplying the photomultiplier.

Amplifier 30 is of the sample and hold type, being controlled by the transmission circuit 34, which also controls the analogue - digital converter 32 and which synchronizes the transmission of the binary signal to transmission means 6. This binary signal can in particular be transmitted on two lines in a differential mode.

A description will now be given of the processing performed by the system according to the invention for the determination of the different geological parameters of the rock, such as the lithology, the nature of the ores and their content. This treatment consists of comparing a standard recorded spectrum with spectrum models contained in a library, whereby said models can be lithology models and/or ore models.

Figures 3, 4A, 4B, 4C:
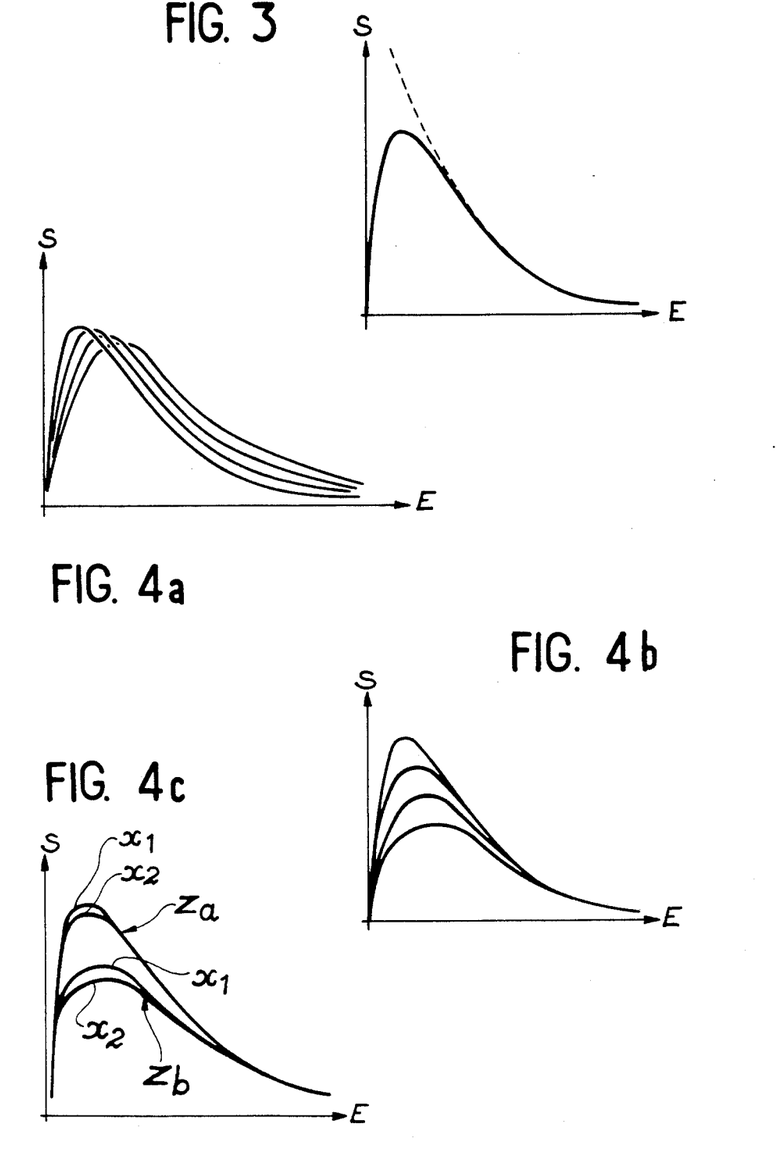
FIG. 3, a graph of a reference spectrum.
FIGS. 4a, 4b and 4c, graphs of spectra respectively illustrating the influence of the lithology, the nature of the ores and the content of the ores on the shape of a spectrum.

FIG. 3 shows the general configuration of a spectrum. The broken line corresponds to the spectrum obtained if there is not photoabsorption. The reference spectrum used for standardizing the recorded spectrum and the spectra of the library can be constituted solely by the spectrum due only to Compton scattering. However, preferably, the reference spectrum also includes the photoabsorption due to the components of the probe. In the case where the lithology is known, the reference spectrum can also include the absorption due to said lithology. The reference spectrum is then obtained by a measurement by placing the probe in said lithology. Finally, if the lithology and the ores are known, the reference spectrum can also include the absorption phenomena due to said lithology.

The graphs shown if FIGS. 4a, 4b and 4c respectively illustrate the influence of the lithology, the nature of the ore and the content of an ore on the energy spectrum detected by the probe.

As can be seen in FIG. 4a, the spectra corresponding to the different lithologies are displaced along the energy axis E. FIG. 4b illustrates the influence of the nature of the ores. The latter are characterized by there photoabsorption, which leads to a displacement of the spectrum along the amplitude axis S in the low energy part of the spectrum and along the energy axis E. Finally, FIG. 4 illustrates the influence of the content of an ore on the spectrum. For two elements of atomic numbers $Z_a$ and $Z_b$ with $Z_a < Z_b$, it shows the curves corresponding to two contents $x_1$ and $x_2$, in which $x_2 > x_1$. These curves are displaced along the amplitude axis S, greatly as a function of the atomic number and to a lesser extent as a function of the content. Thus, each geological parameter has a particular influence on the shape of the spectrum. The invention utilizes this to extract all the geological parameters of the analyzed rock from a single recorded spectrum.

Figure 5:
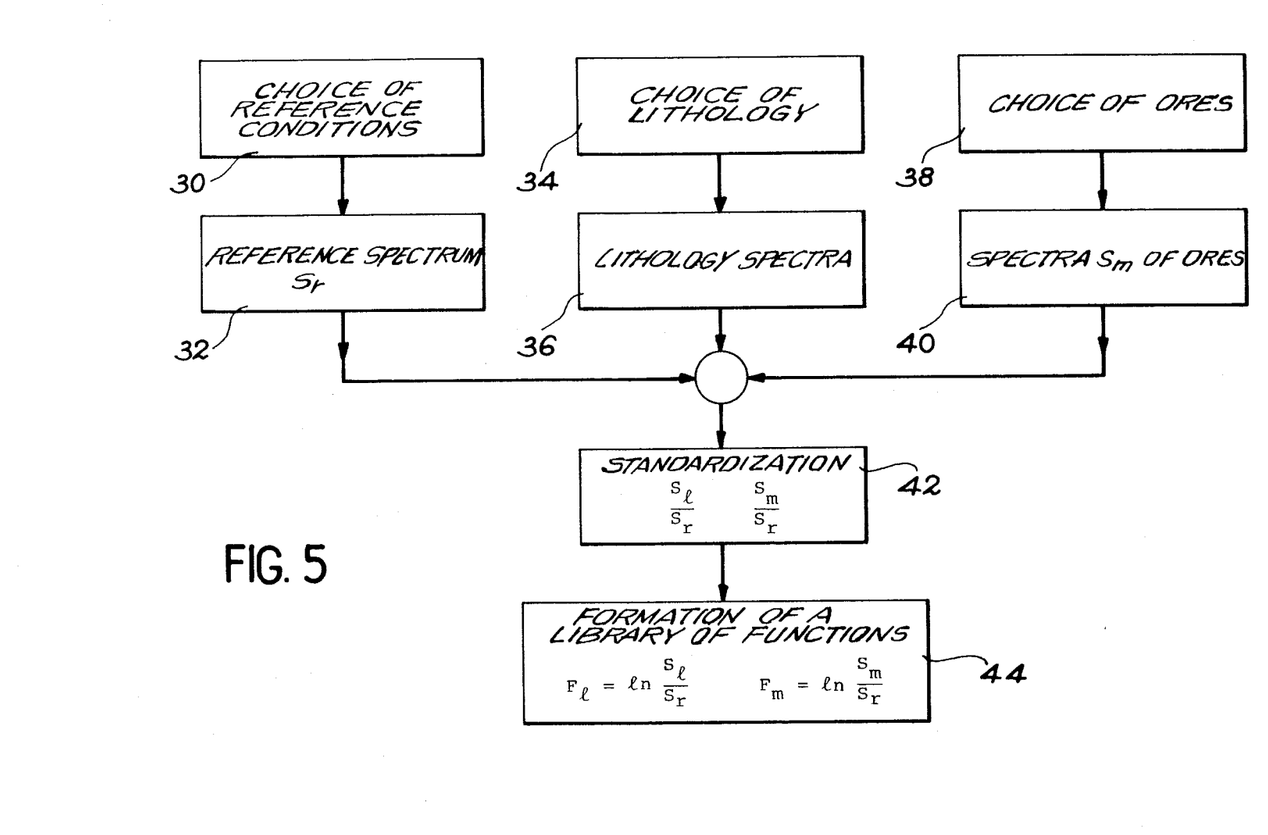
FIG. 5, a flowchart of the operations for forming the library of spectrum models in the system according to the invention.

The processing according to the invention consists of comparing the standard recording spectrum with spectrum models contained in a library, whereby a stage prior to the operation of the system according to the invention is to form this library. FIG. 5 shows in the form of a flow chart, the sequence of operations leading to the creation of the library.

The flowchart shown in FIG. 5 illustrates the creation of a library having lithology spectrum models and ore spectrum models. The formation of this library takes place in four stage, namely a reference spectrum determination stage, an ore spectrum model determination stage and a stage of standardizingly lithology and ore spectra by the reference spectrum.

The first stage involves two operations, namely an operation 30 choosing the reference conditions and an operation 32 determining the reference spectrum $S_r$. The reference conditions are in particular the drilling conditions, the efficiency of the detector used in the probe, the absorption of gamma photons in the probe envelope, etc. The referenced conditions can also include the lithology of the rock in the case where it is only wished to form a library of ore spectrum models, the lithology being known. This particular case is important in practice because, in general, drilling takes place in a relatively well known area. The reference spectrum is determined by operation 32. This determination can be obtained by a measurement under drilling conditions defined by operation 30, or by calculation.

The lithology spectrum model determination stage involves an operation 34 of choosing the lithologies to be modelled and an operation 36 of measuring the spectra of said lithologies. The lithologies can be chosen as a function of the envisaged application (prospecting for uranium, other metals, oil etc). Only a small number of lithologies are chosen, generally about 10. this can in particular involve sandstone, granite, limestone, clay, quartz, etc.

The creation of the spectra of the lithologies chosen is performed by operation 36. These lithology spectrum models can be measured or constructed by calculation. The second solution can be advantageously used for simple materials such as quartz ($SiO_2$) or limestone ($CaCO_3$), e.g. using the Monte Carlo method. For more complex materials, such as e.g. clay, the spectrum models are preferably determined by measurements performed in bores traversing rocks, whose characteristics are well known.

The stage of producing the ore spectrum models involves an operation 38 of choosing standard ores and an operation 40 for producing spectra of these ores. Operations 38 and 40 are identical to operations 34 and 36 of the lithology spectrum model determination stage.

As in the case of the lithologies, standard ores are chosen as a function of the envisaged application. For example, it is possible to choose ores such as uranium, iron, zinc and lead.

The spectrum models of these ores are produced in operation 40. Thus, the spectrum of the pure metal is of no interest, because the ore only exists in nature in the oxide state or as a salt. It is therefore a spectrum model for said salt or said oxide which can be produced. This spectrum model can be obtained by calculation or direct measurement. The spectrum of a pure ore cannot be obtained by a single measurement, because the photoabsorption is too great. An alternative consists of recording the spectrum of a lithology involving an ore with a known content, recording a spectrum of the pure lithology and determining by extrapolation from these two spectra the pure ore spectrum.

The reference spectrum $S_r$ and the spectrum models for lithology $S_l$ and ore $S_m$ having been obtained, the library of models can be formed. This involves an operation 42 of standardizing the spectrum models and an operation 44 of creating the library.

The standardization operation 42 consists of eliminating from the spectrum models the contributions of the Compton effect and the effects due to the reference conditions indicated in operation 30. This standardization consists of dividing each lithology spectrum models $S_l$ and each ore spectrum model $S_m$ by the reference spectrum $S_r$. This division takes place on the spectrum, whose amplitude is measured according to a linear scale. Operation 44 for forming the library consists of storing the standard spectra or a function of said spectra. This function in particular be the logarithmic function.

Figure 6:
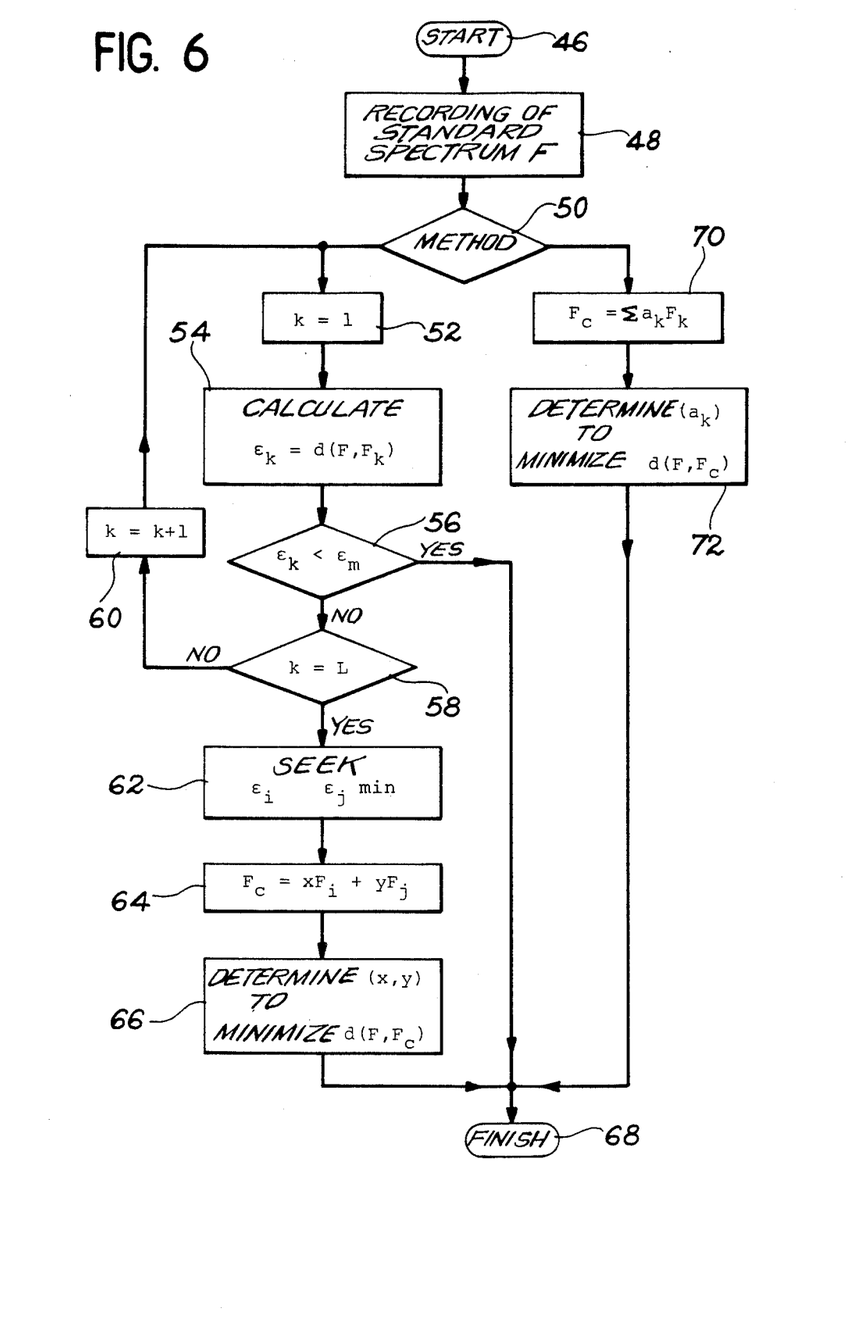
FIG. 6, a flowchart illustrating the sequence of operations performed by the processing means of the system according to the invention for determining the lithology.

FIG. 6 shows a flowchart illustrating the processing performed by the system according to the invention for the determination of the lithology. Processing involves the operations represented by the rectangles and interrogations represented by lozenges located between a start declaration 46 and a finish declaration 68.

The processing starts with the operation 48 of recording the standard or standardized spectrum F of the signal supplied by the probe. The following interrogation 50 consists of a choice in the lithology determination method. According to a first method, represented by the operations and interrogations 52 to 66, the standard spectrum F is successively compared with each lithology spectrum model $F_k$ and if no model is sufficiently close to the standard spectrum F, the lithology is obtain interpolation between the spectrum models $F_i$ and $F_j$ closest to the standard spectrum F. The second method consists of creating a composite spectrum model $F_c$ by linear combination of the lithology spectrum models of the library and determining the coefficients of said linear combination to minimize the distance between the standard spectrum F and the composite spectrum model $F_c$.

A description will firstly be given of the processing corresponding to the first method, which comprises a first operation 52 of initialising a subscript k, a second operation of calculating the distance $\epsilon_k$ between the standard spectrum F and the spectrum model $F_k$ of the library, a comparison 56 between said distance $\epsilon_k$ and a distance threshold $\epsilon_m$. The sequence of stages 52, 54, 56 is repeated for each spectrum model of the library by means of the operation 60 of incrementing subscript k.

If the distance $\epsilon_k$ between the standard spectrum F and the spectrum model $F_k$ is below the distance thresholds $\epsilon_m$, processing is at an end and the lithology of the analysed rock is that of the spectrum model corresponding to function $F_k$. If distance $\epsilon_k$ exceeds the distance threshold $\epsilon_m$ for all the spectrum models in the library, processing continues after comparison 58 with operations 62, 64 and 66. Operation 62 consists of seeking the smallest two distances $\epsilon_i$ and $\epsilon_j$ of the group of distances calculated by operation 54. Operation 64 then creates a composite spectrum $F_c$ by linear combination of the spectrum models $F_i$ and $F_j$ closest to the standard recorded spectrum F. Operation 66 consists of determining the coefficients of said linear combination to minimize the distance between the standard spectrum F and the composite spectrum $F_c$. The lithology of the analyzed rock is a mixture of lithologies corresponding to spectra $F_i$ and $F_j$.

In the second method, the lithology is determined in two stages. A first operation 70 makes it possible to produce a composite spectrum model $F_c$ in the form of a linear combination of all the lithology spectrum models $F_k$ of the library. The second stage, corresponding to operation 72, consists of determining the coefficients to the linear combination, so as to minimize the distance between the standard spectrum F and the composite spectrum model $F_c$. This second method can be advantageously used in the case where the library contains a small number of lithology spectrum models.

In each of the methods, the lithology determination involves the measurement of a distance between the standard spectrum F and a spectrum model, or a linear combination of spectrum models in the library. This distance can be measured in all known manners, particularly by the method of least squares or by a regression.

Figure 7:
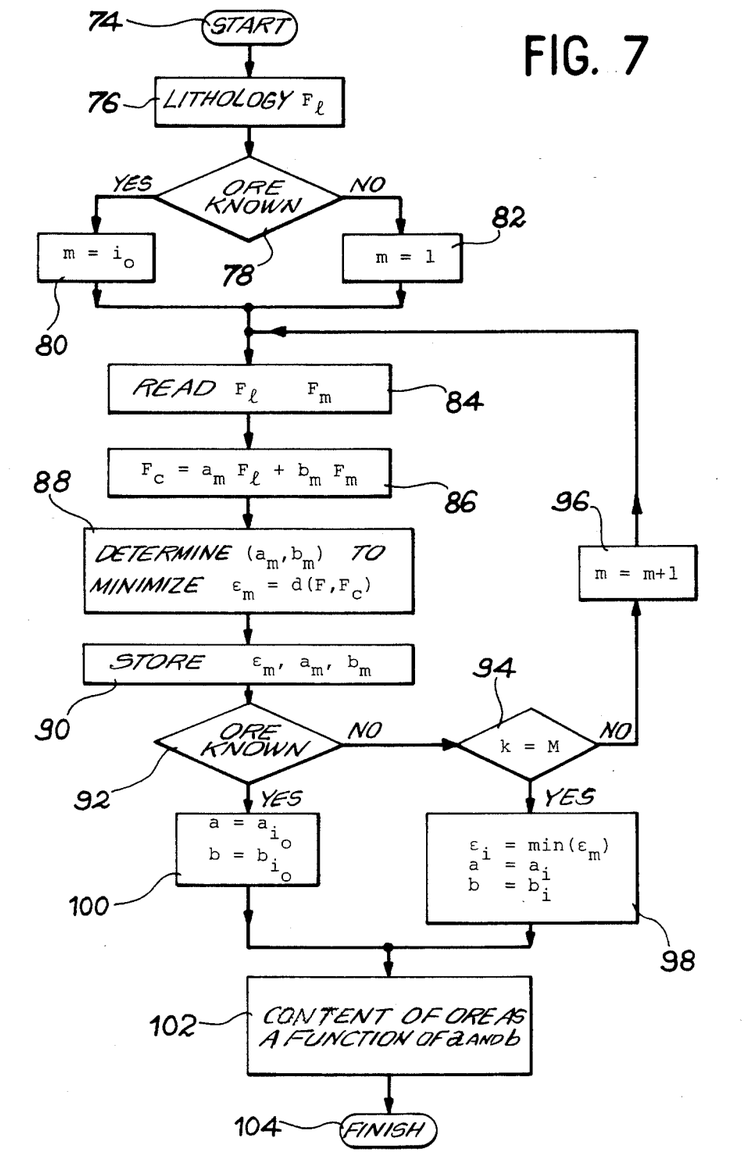
FIG. 7, a flowchart illustrating the sequence of operations performed by the processing means of the system according to the invention for determining the nature of ores and there content.

FIG. 7 shows a flowchart illustrating the processing performed by the system according to the invention for determining the nature of the ores of the rock and their content. This flowchart comprises a group of operations represented by rectangles and a group of interrogations represented by lozenges located between a start declaration 74 and a finish declaration 104.

The first operation of this processing is operation 76 for determining the lithology $F_l$. This lithology can be determined according to the invention by the processing represented by the flowchart of FIG. 6, or can be known a priori. In order that the spectrum recorded during the measurements solely corresponds to the matrix, it is necessary to place the probe at the point where the ore content is lowest. In practice, the measurement of a lithology spectrum model consequently leads to obtaining the spectrum of a rock at several points of a bore, so to detect, by comparison between these spectra, the presence of ores and to only retain the measured spectrum corresponding to the lowest ore content.

Interrogation 78 makes it possible to distinguish the case where the ore is known and the case where it is unknown. In the first case, the processor considers by operations 80 and 84 the spectrum model of the known ore $F_m$ and the lithology spectrum model $F_l$. In the second case, the processor takes the first ore spectrum model (operation 82) and lithology spectrum model.

A composite spectrum $F_c$ is created by linear combination of the lithology spectrum model $F_l$ and the ore spectrum $F_m$ (operation 86). Operations 88 and 90 then consist of determining the pair of coefficients of the linear combination minimizing the distance $\epsilon_m$ between the standard recorded spectrum F and the composite spectrum $F_c$ and then storing said distance and the associated coefficients.

Two cases then occur, depending on whether the ore is known or unknown (interrogation 92). If the ore is not known, operations 84, 86, 88 and 90 are repeated for each ores spectrum model of the library. This is carried out by interrogation 94, which compares m with the number M of ore spectrum models in the library and by operation 96, which increments m. When all the ore spectrum models have been taken into account, by means of operation 98, the composite model $F_c$ closest to the standard recorded spectrum is determined, which defines the nature of the ore.

The content of said ore can then be determined, without any supplementary measurement, on the basis of the coefficients of the composite spectrum model $F_c$, as a function of the lithology spectrum model $F_l$ and the ore spectrum model $F_m$.

In operation 86, a composite spectrum model is created by linear combination of the known lithology and a known or unknown ore. It would also be possible to use a composite spectrum model of $F_c = a.F_1 + \epsilon b_m.F_m$, as in the operation 70 of the processing for determining the lithology represented in FIG. 6. This is in fact rarely of interest, because ores having different chemical characteristics and being created in different geological conditions do not generally coexists in the same rock. It is therefore more natural to produce a composite spectrum model $F_c$ having a single ore spectrum model $F_m$. Nevertheless there are certain special cases where several ores can coexist simultaneously, particularly with zinc and lead. In this case, the composite function $F_c$ can be a linear combination of the lithology model $F_l$, the zinc model $F_{Zn}$ and the lead model $F_{Pb}$.

Moreover, the determination of the ore assuming the knowledge of the lithology, the latter can be included in the reference spectrum. In this case, the composite spectrum model $F_c$ is simply equal to the ore spectrum model $F_m$. The ore content is then determined by the distance between the standard spectrum F and the spectrum model $F_m$.

Another method can be used for determining the uranium content in the case where the reference spectrum includes the lithology. In this case, the processor determines by division the "distance" between the measured spectrum S and the reference spectrum $S_r$, both expressed in a linear amplitude scale. If the two spectra are identical, the result is constant and equal to one, the derivative of the ratio $S/S_r$ being a measure of the distance between the two spectra. It has been experimentally found that the uranium content is a simple function of the maximum of the derivative of the function $S/S_r$.

FIGS. 6 and 7 illustrate the determination by the system according to the invention of the lithology, the nature of ores and there content in a rock. Other geological parameters can also be determined from the recorded spectrum, particularly the density and porosity of the rock.

The measurement of the density of a rock is conventionally carried out on the basis of a gamma-gamma diagraphy. The density is linked with the number of gamma photons recorded by the detector and with the lithology. The gamma-gamma diagraphy being treated by means of a system according to the invention in order to determine the lithology, the density can be deduced without any supplementary measurement by using known nomographs.

In the same way, the porosity can be determined from the recorded spectrum. This porosity is linked with the lithology and the density. The two latter parameters having been determined, the porosity can be calculated in per se known manner.

What is claimed is:

1. A spectrometric gamma diagraphy system for determining the geological parameters of a rock, comprising: a probe introduced into a bore in the ground and supplying an electric pulse signal corresponding to photo-electric absorption of the gamma emission of the rock, transmission means for carrying said pulse signal out of the bore, means for producing an energy spectrum of said pulse signal, and processing means comprising means for standardizing the energy spectrum received in order to standardize said spectrum by amplitude-dividing the received energy spectrum by a reference energy spectrum including at least the Compton scattering phenomenon to obtain a standard spectrum representing the photoabsorption in the rock, a library of energy spectrum models of materials, said spectra being standardized by the reference energy spectrum, said processing means also comprising a processor and storage means, said processor storing the standard energy spectrum received and comparing said spectrum with at least one energy spectrum model of materials, said comparison making it possible to determine the presence of said materials in the analyzed rock.

2. A system according to claim 1, wherein the means receiving the pulse from the transmissiom means supplies an energy spectrum in logarithmic amplitude scale, the mean for standardizing the energy spectrum means performing a subtraction between said spectrum and a reference spectrum, whose amplitude scale is logarithmic, the models of the spectra generally being in logarithmic amplitude scale, said processor determining the linear combination of the spectrum models producing the spectrum closest to said measured standard energy spectrum.

3. A system according to claim 1, wherein the library has a group of lithology energy spectrum models, the processor determining the lithology of rock.

4. A system according to claim 3, wherein, for determining the lithology, the processor successively compares the standard recorded spectrum with each lithology spectrum model, defines a distance between said standard recorded spectrum and each lithology spectrum model, the lithology of the rock being that whose spectrum model is closest, from a distance standpoint, to the standard recorded spectrum.

5. A system according to claim 4, wherein the library also has a group of ore energy spectrum models, the processor determining, after determining the lithology, the nature of the ores of the rock by seeking the linear combination of the lithology spectrum corresponding to said lithology and at least one spectrum from the group of ore spectrum models closest to the standard recorded spectrum.

6. A system according to claim 5, wherein, for determining the nature of the ores in the rock, the processor compares the standard recorded spectrum with a linear combination between said lithology spectrum and an ore spectrum, measures a distance between said standard recorded spectrum and said linear combination, repeats said comparison and said measurement for each ore spectrum and determines the shortest distance, the rock containing the ore corresponding to said shortest distance.

7. A system according to claim 1, for determining the geological parameters of the soil or ground whose lithology is known, wherein the library contains a group of ore energy spectra, the processor determining the nature of ores in the rock by seeking the linear combination of the lithology spectrum corresponding to said lithology and at least one ore spectrum from the group of ore spectrum models closest to the standard recorded spectrum.

8. A system according to claim 7, wherein, for determining the nature of the ores in the rock, the processor compares the standard recorded spectrum with a linear combination between said lithology spectrum and an ore spectrum measures a distance between said standard recorded spectrum and said linear combination, repeats said comparison and said measurement for each ore spectrum and determines the shortest distance, the rock containing the ore corresponding to said shortest distance.

9. A system according to claim 1, wherein the reference spectrum includes the lithology spectrum, the library then only having a group of ore spectra.

10. A system according to claim 2 wherein the processor determines the content of the ores as a function of the multiplication coefficient of at least one ore spectrum.

11. A system according to claim 1, for the determination of the content of a known ore in ground with a known lithology, wherein the reference spectrum includes the lithology spectrum, the processor determining the content of the ore by the maximum of the derivative of the standard spectrum received.

* * * * *